June 6, 1944. J. E. CUNNINGHAM 2,350,593
STEERING WHEEL TRUCK FOR TRACTORS
Filed April 16, 1943 2 Sheets-Sheet 1

Inventor
James E. Cunningham

By Clarence A. O'Brien
and Harvey B. Jacobson
Attorneys

June 6, 1944.  J. E. CUNNINGHAM  2,350,593
STEERING WHEEL TRUCK FOR TRACTORS
Filed April 16, 1943  2 Sheets-Sheet 2

Inventor
James E. Cunningham

By Clarence A. O'Brien
and Harvey B. Jacobson
Attorneys

Patented June 6, 1944

2,350,593

UNITED STATES PATENT OFFICE 2,350,593

STEERING WHEEL TRUCK FOR TRACTORS

James E. Cunningham, Littlefield, Tex., assignor of one-third to J. V. McCallister and one-third to J. T. Douglass, both of Littlefield, Tex.

Application April 16, 1943, Serial No. 483,300

2 Claims. (Cl. 280—87)

My invention relates to improvements in steering wheel trucks for tractors, particularly farm tractors, the primary object in view being to equip such vehicles with a pair of front steering wheels relatively adjustable into different angularly related planes, or into parallel planes, to thereby facilitate steering when the wheels are traveling in furrows, or along ridges, or over substantially level ground.

To the accomplishment of the above, and subordinate objects presently appearing, a preferred embodiment of my invention has been illustrated in the accompanying drawings, set forth in detail in the succeeding description, and defined in the claims appended hereto.

Figure 1:
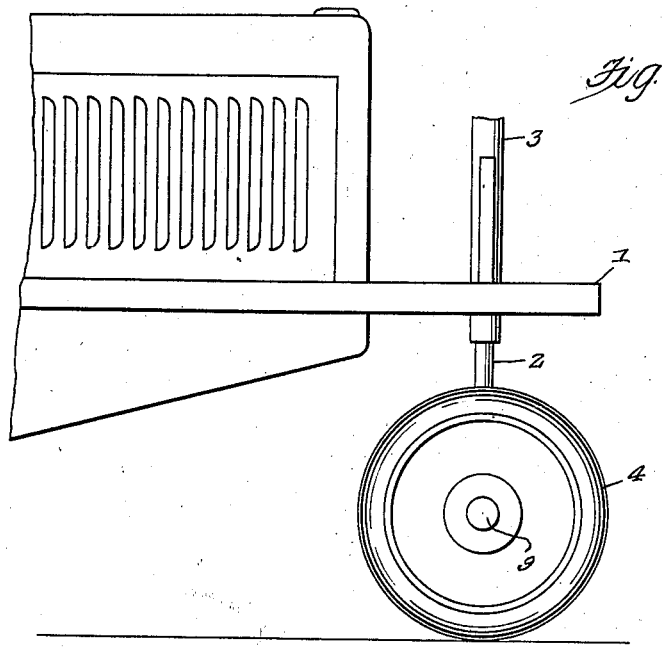
Figure 2:
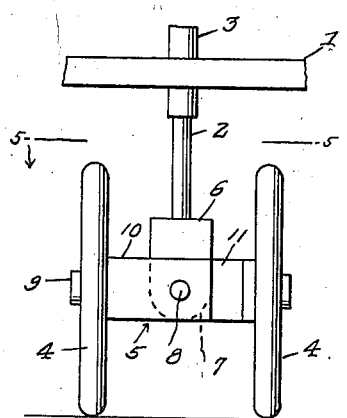
Figure 6:
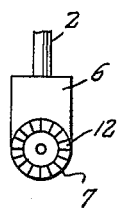
Figure 3:
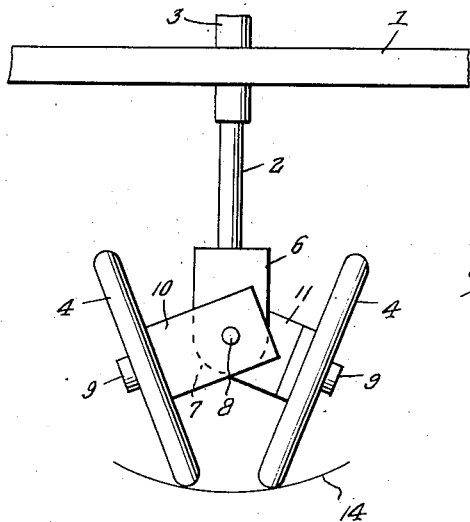
Figure 4:
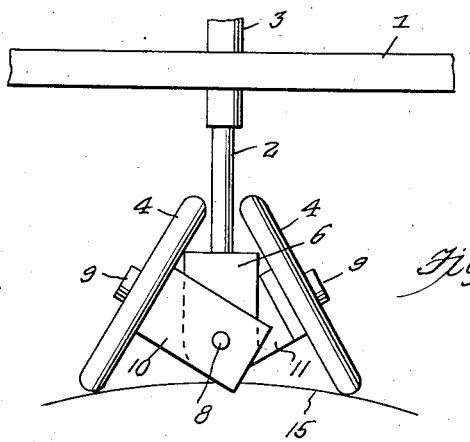
Figure 5:
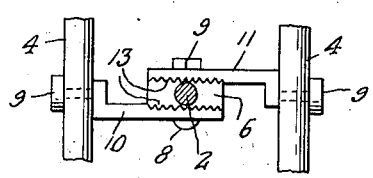

In said drawings:

Figure 1 is a fragmentary view in side elevation of a tractor equipped according to my invention, Figure 2 is a similar view in front elevation, Figure 3 is another similar view showing the steering wheels adjusted to travel in a furrow, Figure 4 is another similar view showing the steering wheels adjusted to travel along a ridge, Figure 5 is a detail view in horizontal section, taken on the line 5—5 of Figure 2, and Figure 6 is a fragmentary view in side elevation of the steering post and the knuckle jack member thereon.

Reference being had to the drawings by numerals, according to my invention, the chassis 1 of the tractor is provided with a substantially vertical steering post 2 suitably mounted for turning in opposite directions, as in a bearing sleeve 3 fixed to the front end of the chassis 1, in any desired manner. The steering post, as will be understood, is designed to be connected to a steering mechanism, not shown. A pair of closely spaced steering wheels 4 are mounted on the lower end of the steering post by means of a knuckle joint designated generally by the numeral 5. The knuckle joint 5 comprises an elongated, flat-sided knuckle joint member 6 depending from the lower end of the steering post 2 coaxially with respect thereto and which is enlarged, as compared with the steering post 2, and suitably connected to said post to dispose the flat sides thereof forwardly and rearwardly, respectively. The lower end of the knuckle joint member 6 is preferably rounded, as at 7, and said end is provided with a bolt 8 extending centrally therethrough from side to side of said member and provided with a nut 9.

The steering wheels 4 are rotatably mounted upon opposite sides of the knuckle joint member 6, respectively, upon suitable stub axles 9' extending centrally from the outer ends of a pair of elongated, flat-sided knuckle joint members 10, 11. The knuckle joint members 10, 11 are opposed flatwise to opposite sides of the knuckle joint 6 and pivotally mounted on the bolt 8 to extend endwise, oppositely, laterally from said bolt for vertical swinging movement about an horizontal axis provided by said bolt, the bolt extending through the inner ends of said knuckle joint members 10, 11 and together with the nut 9 providing for clamping said inner ends of said members against the opposite sides of the knuckle member 6 in different set positions. As best shown in Figures 5 and 6, the lower end 7 of the knuckle joint member 6 is provided on opposite sides thereof with circular series of radial teeth 12 concentric to the bolt 8, and the inner ends of the knuckle joint members 10, 11 with complemental series of similar teeth 13, whereby the inner ends of said members 10, 11 may be interlocked with the knuckle joint member 6 under tightening of the nut 9 and in different set positions of said members 10, 11.

By virtue of the described knuckle joint 5, the knuckle joint members 10, 11 may be swung downwardly on the bolt 8 into relatively angular relation to slant the steering wheels 4 into downwardly converging relation for travel in a furrow 14, as shown in Figure 3, or said members 10, 11 may be swung upwardly on said bolt 8 into angular relation to adjust the steering wheels into downwardly diverging relation for straddling a ridge 15. For travel over generally level ground, as represented at 16, in Figure 2, the knuckle joint members 10, 11 may be adjusted in longitudinal alignment to dispose the steering wheels 4 into substantially vertical planes. By virtue of the described adjustments of the steering wheels 4, steering will be facilitated, in a manner which will be clear, when the tractor is traveling along the ground having the contours for which the various adjustments are specified.

It may be explained that the front end of the chassis 1 may be jacked up, by any suitable means, to lift the steering wheels 4 off the ground preparatory to making the various adjustments of said wheels.

The foregoing will, it is believed, suffice to impart a clear understanding of my invention.

Manifestly, the invention, as described, is susceptible of modification without departing from the inventive concept, and right is herein reserved to such modifications as fall within the scope of the appended claims.

What I claim is:

1. The combination with a tractor, of a front wheel steering truck including a steering post, a pair of front steering wheels, and means to mount said wheels on the lower end of the post upon opposite sides thereof, respectively, for adjustment relatively into planes at different angles to the vertical comprising a knuckle joint member fixed to the lower end of said post and having front and rear sides, and a pair of elongated knuckle joint members having inner ends pivoted to opposite sides of said first joint member for independent swinging of said pair of members vertically into different set positions, said pair of wheels being rotatably mounted on the outer ends of the joint members of said pair, respectively.

2. The combination with a tractor, of a front wheel steering truck including a steering post, a pair of front steering wheels, and means to mount said wheels on the lower end of the post upon opposite sides thereof, respectively, for adjustment relatively into planes at different angles to the vertical comprising a knuckle joint member fixed to the lower end of said post and having front and rear sides, and a pair of elongated knuckle joint members having inner ends pivoted to opposite sides of said first joint member for independent swinging of said pair of members vertically into different set positions, said pair of wheels being rotatably mounted on the outer ends of the joint members of said pair, respectively, and means to retain said pair of joint members in set position.

JAMES E. CUNNINGHAM.